Patented Feb. 4, 1930

1,745,601

UNITED STATES PATENT OFFICE

HARRY WILLIAMS CHARLTON, OF NEW YORK, N. Y.

METHOD OF PRODUCING SAND-LIME BRICKS

No Drawing.     Application filed November 18, 1926.  Serial No. 149,276.

This invention relates to a method of improving the quality of sand lime brick, and other materials manufactured in a similar way, by effecting a reduction in water absorption, and an increase in the water shedding properties.

The object of this invention is to produce a brick that, when laid in the wall, will completely shed the water. Thus during a rain it will run off instead of being soaked in and appearing in the form of dew on the inner wall. As an additional object I desire to so fill the voids and interstices with a colloidal material, that the more or less unavoidable surface and internal weathering will be reduced to a minimum.

As an example of my invention I may take a mixture of about 90 parts of clean sharp sand, and 10 parts, (calculated by weight as CaO,) of lime, substantially free of MgO, the lime being thoroughly hydrated. I intimately mix the two and so regulate the moisture content that when the mixture is squeezed in the palm of the hand, and the hand opened, the mass will just hold together. The material is then moulded and compressed in the usual sand lime brick presses. These machines are well known and do not require any further explanation except to state that they exert a pressure of from 60 to 150 tons on the mixture composing each brick, and may thus be classed as high pressure machines. After pressing the green brick are lifted off the press and piled edgewise, brick against brick, on the car, the ends alone being exposed. The cars carrying about 1000 brick, are run into hardening cylinders and subjected to the action of steam under a pressure of from 110 to 135 pounds for about 8 hours.

The above mentioned steps are well known in the sand lime brick industry, and do not constitute a part of this invention. At this point I vary the usual procedure. I inject into the sealed cylinders, either before or after the steam is blown off, a solution capable of reacting with or impregnating the brick, and improving it. As one example I may use a 2 to 3% solution of sodium stearate or alkali salt of like fatty acid. After the brick have been immersed for from ten to twenty minutes, the solution is drawn off, the cylinder opened and the cars immediately pulled out to cool and dry.

Although I have specified sand lime brick in the reference to my new method of treatment, I wish to include all materials of this nature, such as tile, building blocks, insulating partitions, roof tile, and internal paving blocks. Sand lime brick typifies a type of plastics in which two inorganic materials are intimately mixed and compressed, and then exposed to the action of steam under pressure, and in which the steam induces interactions, and the mass is permanently cemented together, during and resulting from the chemical action.

It is generally conceded that the binding agent in sand lime brick is a hydrous silicate formed by the interaction of the lime and sand during the steaming operation. Every particle of sand is coated with lime, and as the hydrous silicate is formed it cements the unacted on portions of the sand grains together. The object in subjecting the mass to high pressure is to bring the particles in as intimate a contact as possible, that the binding agent may exert its maximum efficiency. In spite of this there is always a decided porosity and water absorption due to the unfilled voids and the affinity of the hydrous silicate for water. The almost universal criticism of sand lime brick is its excessive absorption, and in some cases the almost avidity with which it sucks up water.

I have now discovered a method of overcoming this difficulty by employing the most suitable time to treat the brick with a solution capable of reacting with it and impregnating it. I take the brick immediately after the hydrous silicate is formed, and before it has cooled down, and thus the solution is drawn in and replaces the condensing steam which fills the voids. As the brick at the end of the steaming operation are in a sealed cylinder I usually add the solution directly. This condenses the steam and forms a partial vacuum in the body of the brick, and the aqueous liquid is aided in penetrating, as above mentioned. The bricks are treated without removal from the cars, and the entire mass, including the cars, are immersed.

Another method of carrying out my invention consists in removing the hot brick from the cylinder and at once immersing them in a liquid bath. This is scarcely as efficient because the brick cool off to a certain extent before the treatment, and do not as rapidly expel and evaporate the water after the treatment. In addition a treatment after the brick are removed from the cylinder involves considerable additional labor, handling and equipment.

As above mentioned the steam may be entirely blown off after the hardening, and before the solution is pumped in, but I prefer to only partially blow off the steam and leave enough to heat up the incoming solution, and also cause a partial vacuum due to the condensation of the steam.

Although I have referred chiefly to the treatment with solutions that will reduce the water absorption, I do not wish to be limited in any way in this respect. I may employ any aqueous fluid that will react with the brick to improve it in any manner, such as in strength, color, texture, etc. The present application deals more particularly with my discovery of the auspicious time in the process of manufacture, to effect this treatment.

I claim:—

1. A method of manufacturing sand lime brick which comprises subjecting it to steam pressure in a hardening cylinder till the brick have attained the required strength; blowing off a portion of the steam; adding sufficient aqueous solution to condense the steam remaining in the hardening cylinder; drawing off the liquid and removing the brick from the cylinder to cool and dry.

2. A method of manufacturing sand lime brick which comprises steaming it under a pressure of 135 pounds for a period of 8 hours, partially blowing off the steam and retaining sufficient to heat the incoming aqueous solution to slightly below the boiling point; injecting into the hardening cylinder an aqueous solution capable of acting on the brick and improving its quality; blowing off the aqueous solution and withdrawing the brick from the cylinders to permit them to cool and dry.

3. A step in the process of manufacturing sand lime brick which comprises immersing in the hardening cylinder the hot brick, whose voids are filled with steam, in a solution at a temperature sufficiently low to condense all the steam in the brick, and accelerate the absorption of the liquid by the brick; the said solution carrying a salt capable of uniting with the recently formed hydrous silicate and free lime to produce a gelatinous water-repelling colloid in the interstices of the brick.

4. A step in the process of manufacturing sand lime brick which comprises injecting into the hardening cylinders in which the brick are steamed under pressure, an aqueous solution capable of improving the quality of the brick; and discharging the solution from the hardening cylinders.

5. A method of manufacturing sand lime brick which comprises steaming the green brick under pressure in a hardening cylinder till the reaction between the sand and the lime has developed the required hardness; blowing off the steam and before the brick have been removed from the hardening cylinder, submerging them in an aqueous solution capable of improving the quality; removing them from the solution and allowing to dry.

HARRY WILLIAMS CHARLTON.